United States Patent [19]

Chee

[11] Patent Number: 4,534,167

[45] Date of Patent: Aug. 13, 1985

[54] INLET COWL ATTACHMENT FOR JET ENGINE

[75] Inventor: Wan T. Chee, Bellevue, Wash.

[73] Assignee: The Boeing Company, Seattle, Wash.

[21] Appl. No.: 485,575

[22] PCT Filed: Dec. 27, 1982

[86] PCT No.: PCT/US82/01816

§ 371 Date: Dec. 27, 1982

§ 102(e) Date: Dec. 27, 1982

[87] PCT Pub. No.: WO84/02507

PCT Pub. Date: Jul. 5, 1984

[51] Int. Cl.³ .............................................. F02C 7/20
[52] U.S. Cl. ................................. 60/226.1; 60/39.31; 415/119; 181/214
[58] Field of Search ............... 60/39.31, 39.32, 226.1; 415/119; 137/15.1, 15.2; 244/53 B; 181/213, 214, 222, 292

[56] References Cited

U.S. PATENT DOCUMENTS

| | | |
|---|---|---|
| 3,721,460 | 3/1973 | Holman et al. |
| 4,112,677 | 9/1978 | Kasmarik ............... 60/226.1 |
| 4,132,069 | 1/1979 | Adamson et al. ......... 60/39.31 |
| 4,209,149 | 6/1980 | Morris et al. .......... 137/15.1 |
| 4,240,250 | 12/1980 | Harris ................. 415/119 |
| 4,361,296 | 11/1982 | Hall et al. ............ 60/39.31 |

FOREIGN PATENT DOCUMENTS 2005792 12/1969 France .

Primary Examiner—Carlton R. Croyle
Assistant Examiner—Jeffrey A. Simenauer
Attorney, Agent, or Firm—Christensen, O'Connor, Johnson & Kindness

[57] ABSTRACT

In a jet engine in which the engine cowling includes an inlet cowl and an engine containment case and in which at least a portion of the interior surface of the inlet cowl is covered by an acoustic treatment material, a system for attaching the inlet cowl to the engine containment case icludes an attachment ring that is substantially U-shaped in cross section having a web and first and second legs extending orthogonally from the web. The first leg abuts an engine flange that is a part of the engine containment case. The first leg and engine flange are secured to one another by threaded fasteners. The web is attached to the acoustic treatment material by fasteners that pass through the web and the acoustic treatment material. The acoustic treatment material is effective up to the interface between the inlet cowl and the engine containment case.

7 Claims, 4 Drawing Figures

INLET COWL ATTACHMENT FOR JET ENGINE

BACKGROUND OF THE INVENTION

This invention relates to jet engine cowling structure and more particularly relates to a system for attaching the inlet cowl of an engine system to the engine containment case.

Typically, the inlet cowl associated with a jet engine is a separate piece that must be attached to the engine containment case. The prior art system used to attach the inlet cowl to the engine containment case has been a heavy, forged ring attached by bolts to a flange formed on the forward end of the engine containment case. Typically, the interior surface of the inlet cowl is lined with an acoustic treatment material, such as a honeycomb core covered by a perforated skin, to control the noise produced by the engine. The prior art inlet cowl attachment system utilizes a doubler plate fastened to the forged ring to add strength to the attachment area. The double plate is solid and negates the function of the perforated skin of the acoustic treatment material in the area covered by the doubler plate. The effective area of the acoustic treatment panel is reduced by the size of the doubler; therefore, in order to achieve the required effective area of acoustically treated inlet surface, it is necessary to make the inlet cowl longer in an amount equal to the width of the doubler. The use of a heavy, forged ring plus the doubler plate and the need to lengthen the inlet cowl to compensate for the presence of the doubler plate all tend to add a significant amount of weight to the aircraft upon which the engine is mounted.

SUMMARY OF THE INVENTION

In a jet engine, such as a turbofan engine, in which the engine cowling includes an inlet cowl and the engine is surrounded by an engine containment case, a system for removably attaching the inlet cowl to the engine containment case includes a channel member formed into a ring. The channel has a web and first and second legs extending substantially orthogonally from the web. The first leg abuts and is removably attached to an engine flange formed on the engine containment case. The leg of the channel is attached to the engine flange by fasteners such as bolts that pass through holes in the flange and the first leg and are held in place by nuts threaded onto the bolts. The web of the channel is attached directly to an acoustic treatment panel that lines the interior surface of the inlet cowl. The channel design applies the load of the inlet cowl directly to the bolts and engine flange thereby eliminating the need for the reinforcing doubler plate that is presently utilized in the attachment of the inlet cowl to the engine containment case. The acoustic treatment panel covers the entire interior surface of the inlet all the way to the inlet cowl/containment case interface and is functional over its entire area.

DETAILED DESCRIPTION OF THE PREFERRED EMBODIMENT

Figure 1:
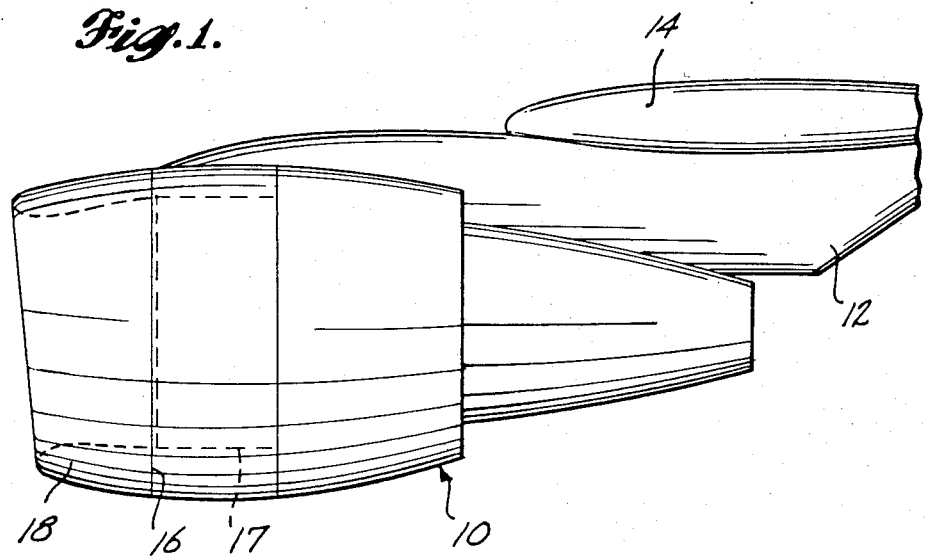
FIG. 1 is an outline drawing of a side elevational view of a typical jet engine and cowling attached to an aircraft wing.

Referring to FIG. 1, a typical turbofan jet engine 10, such as a PW2037 engine made by Pratt-Whitney Co. of East Hartford, Conn., is mounted on a strut 12 attached to the wing 14 of an aircraft. Typically, the engine manufacturer provides the engine portion pictured to the right of line 16 in FIG. 1. The aircraft manufacturer typically specifies and provides the inlet cowl 18 that is to be attached to the front end of the engine. The inlet cowl is designed by the aircraft manufacturer to meet certain specifications with regard to airflow into the engine and noise reduction among other parameters.

Figure 2:
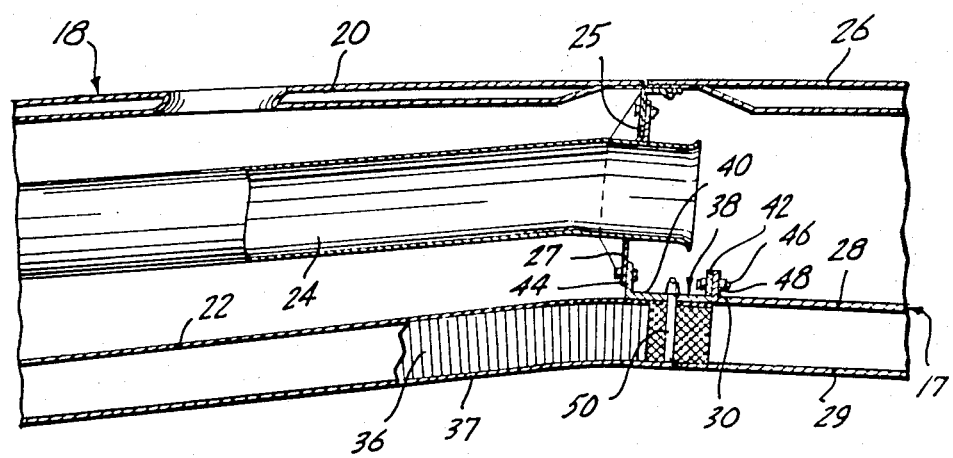
FIG. 2 is a side elevational view in partial section of the area of attachment of the inlet cowl to the engine containment case.

FIG. 2 shows a detailed section of the engine cowling at the location where the inlet cowl 18 attaches to the engine containment case 17 surrounding the engine. The inlet cowl includes an outer skin 20 and an inner skin 22 spaced from one another and formed generally in the shape of an annulus thereby forming the annular inlet cowl 18. An internal hot air duct 24 for thermal anti-icing of the inlet cowl is located in the space between the inner and outer skins 20 and 22 and is mounted to the cowl by means of mounting struts 25 and 27. The duct 24 will not be described in detail, as it is conventional and forms no part of the present invention. The engine containment case 17 is also of conventional design and includes an outer skin 26 and a double-walled inner casing comprised of wall members 28 and 29 that surrounds the engine and fan assembly. Wall member 28 has an engine flange 30 formed at its forward end at substantially right angles to the wall member 28. The engine flange 30 is attached directly to the inlet cowl 18. The inner skin 22 of the inlet cowl is solid. A portion of the inlet cowl is acoustically treated by being lined with a composite material such as honeycomb panels. The honeycomb panels are constructed of a honeycomb core 36 that is sandwiched between the inner skin 22 and an acoustic skin 37 that is perforated to permit the honeycomb core to act as a resonator and acoustic diffuser to minimize the noise produced at the intake end of the engine.

Figure 3:
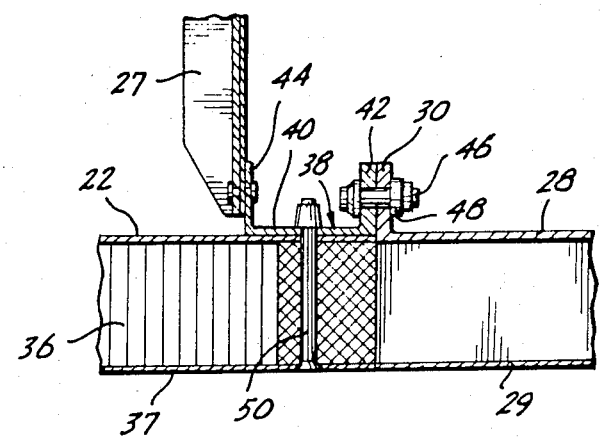
FIG. 3 is a side elevational view of one embodiment of the system of the present invention for attaching the inlet cowl to the engine containment case.

As can be seen in greater detail in FIG. 3, an inlet attachment ring 38 is a substantially U-shaped channel including a web 40 and first and second legs 42 and 44 extending substantially orthogonally from the web. The first leg 42 abuts the engine flange 30. The inlet cowl is attached to the engine containment case by means of bolts 46 that pass through the first leg 42 and engine flange 30. The bolts are secured by nuts 48 threaded onto the bolts. In a typical engine approximately 20 to 24 bolts are in place spaced around the flange 30 to hold the inlet cowl 18 to the engine containment case 17. The honeycomb panel is attached to the inlet attachment ring 38 by means of fasteners 50, spaced around the circumference of the ring, that pass through the honeycomb panel and the web 40 of the attachment ring 38. In the preferred embodiment, the fasteners 50 are lockbolts. Preferably, the honeycomb core 36 in the vicinity of the fasteners 50 is of a higher density than the honeycomb core lining the remaining interior surface of the inlet cowl.

Figure 4:
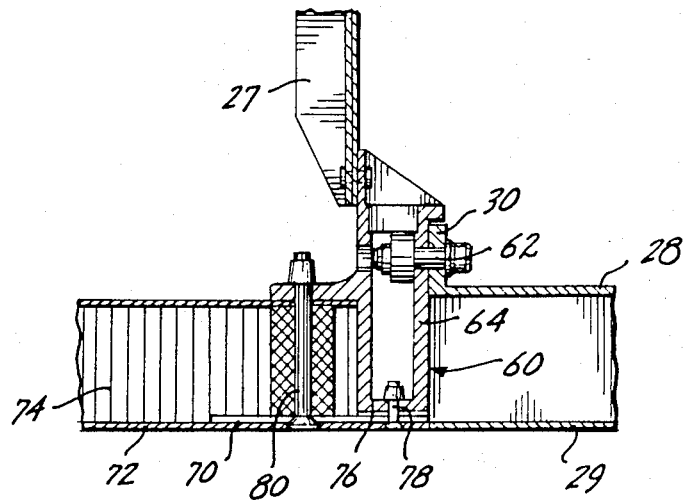
FIG. 4 is a side elevational view of the system used in the prior art for attaching the inlet cowl to the engine containment case.

For the sake of comparison, FIG. 4 shows the prior art system used to attach the inlet cowl to the engine containment case. Because of the configuration of the prior art attaching ring 60, shown in FIG. 4, three bolts are necessary to perform the attachment function carried out by two bolts in the system of the invention. A bolt 62 passes through the engine flange 30 and a first leg 64 of the attaching ring 60. The design of the prior art attaching ring 60 necessitates reinforcement of the inlet cowl adjacent the interface. The reinforcement is accomplished by means of a doubler plate 70 that is sandwiched between the perforated skin 72 of the acoustic composite material 74 and the web 76 of the attachment ring 60. The doubler plate 70 is a solid member except for the holes necessary to accommodate fasteners 78 and 80 that hold the composite material 74 to the attachment ring 60. Since the double plate 70 is a solid piece, it cancels the effect of the perforations in the perforated inner skin 72 of the acoustic composite material 74. The acoustic effectiveness of the composite material 74 is directly proportional to the size of the area that is treated. The doubler plate 70 thereby reduces the effectiveness of the acoustic diffusing material in an amount equal to the area of the perforated skin that is covered by the doubler plate. In order to obtain the specified acoustic control, it is therefore necessary to increase the size of the inlet cowl by making the inlet cowl longer in order to recapture the acoustically treated area lost to the doubler plate 70. Lengthening of the inlet cowl adds to the overall weight of the engine and aircraft.

Contrariwise, the attachment system of the present invention, as shown in FIG. 3, eliminates the necessity for the doubler plate 70 because it applies the inlet cowl load directly to the engine flange 30 through the bolts 46. Elimination of the doubler plate 70 thereby effectively increases the acoustically treated area and allows for reduction in the length of the inlet cowl since the same acoustically treated area can be obtained with a shorter inlet cowl. By eliminating the doubler plate and shortening the length of the inlet cowl a significant weight savings is obtained for each engine and therefore an overall weight savings is achieved for the aircraft.

The design of the attachment ring in accordance with the principles of the present invention also permits the attachment ring to be made out of an extruded aluminum channel as well as a machined aluminum block. The prior art attachment ring 60 shown in FIG. 4 is a heavily machined aluminum forging that in itself is bulkier and weighs more than the channel-shaped attachment ring of the present invention.

The present invention therefore provides a simple system for attaching the inlet cowl to the engine containment case. An extruded channel-shaped attaching ring is attached directly to the engine flange by a series of bolts. The web of the channel is attached directly to a panel of composite material that lines the interior surface of the diffuser portion of the inlet cowl without the need of a reinforcing solid doubler plate. The specified acoustically treated area of the inlet utilizing the attachment system of the invention can be obtained with a shortened inlet cowl. While a particular embodiment of the invention has been illustrated and described, it should be noted by those of ordinary skill in the art and others that modifications can be made to the illustrated embodiment while remaining within the scope of the present invention. The invention should therefore be defined solely by reference to the claims herein.

The embodiments of the invention in which an exclusive property or privilege is claimed are defined as follows:

1. In a gas turbine engine surrounded by a cowl, said cowl having an inlet portion of generally annular shape and including an interior skin and also having an engine containment portion, a system for removably attaching said inlet portion to said engine containment portion includes:

an inlet-mounting flange extending from said engine containment portion;

an inlet-mounting ring of substantially U-shaped cross section having a web and first and second legs extending orthogonally from said web, said first leg abutting said engine-mounting flange and being removably affixed thereto, said web overlying and being removably affixed to a first surface of the interior skin of said inlet portion so as to hold said inlet portion and engine containment portion in immediate adjacency; and sound-absorbing means affixed to a second surface of said interior skin in an area immediately adjacent said engine containment portion.

2. The system of claim 1 wherein the sound-absorbing means includes a honeycomb panel affixed to said second surface of said inner skin and a perforated skin affixed to said honeycomb panel spaced from said second surface so as to contain said honeycomb panel between said second surface and said perforated skin.

3. The system of claim 1 wherein said inlet-mounting ring is formed by an extrusion process.

4. The system of claim 1 wherein said acoustic treatment material comprises a honeycomb core covered by a perforated skin material on a first surface and by a solid skin material on a second opposite surface.

5. The system of claim 4 wherein said honeycomb core material that is in proximity to said interface is of higher density than the honeycomb core material covering the remainder of the inlet portion.

6. The system of claim 1 wherein said first leg is removably affixed to said flange by means of bolts passing through said first leg and said flange and held captive by nuts threaded onto said bolts.

7. The system of claim 6 wherein said web is affixed to said acoustic treatment material by means of fasteners passing through said web and said acoustic treatment material.

* * * * *